United States Patent [19]

Liu

[11] Patent Number: 4,614,659
[45] Date of Patent: Sep. 30, 1986

[54] METHOD FOR TREATING PINEAPPLES

[75] Inventor: Yuan K. Liu, Concord, Calif.

[73] Assignee: Del Monte Corporation, San Francisco, Calif.

[21] Appl. No.: 718,790

[22] Filed: Apr. 1, 1985

[51] Int. Cl.$^4$ ............................................. A23B 7/00
[52] U.S. Cl. .................................... 426/321; 426/102
[58] Field of Search ...................... 426/321, 323, 532; 71/65, 86, 89; 427/4

[56] References Cited

U.S. PATENT DOCUMENTS 3,346,397 10/1967 Gortner .............................. 426/321
4,094,664 6/1978 Thomas .
4,328,026 5/1982 Kliegman et al. .
4,344,971 8/1982 Garbutt .

FOREIGN PATENT DOCUMENTS 7411242 2/1975 Netherlands ........................ 426/321

OTHER PUBLICATIONS

Pantastico, 1975, Postharvest Physiology, Handling and Utilization of Tropical and Subtropical Fruits and Vegetables, AVI Publishing Co., Inc., Westport, Ct., pp. 150–151.
Janick, 1972, Horticultural Science, W. H. Freeman and Co., San Francisco, 2nd Edition, pp. 114–116, 173–174.
Ward, 1923, The Encyclopedia of Food, Union Square, New York, pp. 396, 397 and 399.
Auckland et al., 1982, McGraw-Hill Encyclopedia of Science and Technology, 5th Edition, pp. 255–259.

Primary Examiner—Raymond N. Jones
Assistant Examiner—Carolyn Paden
Attorney, Agent, or Firm—Herbert J. Bluhm

[57] ABSTRACT

The crowns of mature pineapples ready for harvest are treated with an aqueous medium containing sufficient amounts of a gibberellin to retard withering and senescense of the crowns. The medium is preferably applied to the crowns soon after the pineapples have been harvested. The pineapples treated in accordance with this invention retain a freshly harvested appearance for an extended period of time and make them ideally suited for sale in the fresh fruit market.

12 Claims, No Drawings

METHOD FOR TREATING PINEAPPLES

TECHNICAL FIELD

This invention relates to the treatment of pineapples which are intended for sale as fresh produce in the fresh fruit market.

BACKGROUND OF THE INVENTION

The appeal of fresh fruits and vegetables to consumers is universal and forms the basis for a huge fresh produce market. Since most fruits and vegetables are highly perishable, the production and marketing of fresh produce results in substantial losses due to spoilage or deterioration in quality. Very considerable efforts have been directed to reducing these losses so that consumers may enjoy the highest quality produce at the lowest possible price. These efforts have given rise to a number of techniques which involve treatment not only of the harvested produce but also of the growing plants.

The treatment of harvested produce includes storage and/or shipment of the produce under controlled conditions of temperature, pressure, humidity and air circulation. Particular gaseous atmospheres have also been employed to suppress growth of harmful fungi on fresh produce or to control the ripening process of certain fruits subsequent to harvest. Another technique that has been widely used to extend the shelf life of fresh fruits and vegetables is the application of waxy protective films which tend to reduce moisture loss, respiration and spoilage. Such films may include low levels of fungicides or other active agents to enhance the protection afforded thereby.

In certain instances the shelf life of harvested fruits and vegetables may be influenced by plant growth regulators applied to the growing plants prior to the harvesting step. Thus, treating agents which alter the ripening process or control fruit drop when applied to growing plants may have an effect on the shelf life of the harvested fruit insofar as they affect the condition of the fruit at the time of harvest. As a general rule, however, plant growth regulators are employed for improving yields and quality, reducing production costs or providing other benefits related specifically to the commercial cultivation of fruit and vegetable crops. For example, the gibberellins constitute an important group of plant growth regulators which are used to increase the size of young fruits in the commercial production of grapes. Gibberellins have also been found to cause stem elongation of sugar cane thereby leading to increased yields of sugar from the cane produced.

The commercial cultivation of pineapples includes the production of a significant amount of fruit that is destined for sale in the fresh fruit market. Pineapples are somewhat unique in that the usual form in which they are sold in the fresh fruit market is characterized by a group of small leaves at the top of the pineapple that is normally called the crown. The yellowish-brown shell or skin of the pineapple is conventionally provided with a wax coating to retard deterioration of the fruit. The crown of the harvested and wax-coated pineapple, however, is susceptible to withering and senescence leading to an overall appearance that is unappealing to the consumer. Although a deteriorated crown may reflect a corresponding deteriorated condition of the fruit, such is not necessarily the case. Nevertheless, a pineapple whose crown has undergone significant deterioration will encounter consumer resistance because the fruit is perceived as having suffered a loss in quality and freshness.

SUMMARY OF THE INVENTION

The present invention provides a method for extending the shelf life of fresh pineapple intended for sale in the fresh fruit market. This method involves treatment of the crown of the pineapple with a gibberellin to retard withering and senescene of the leaves which make up the crown. The freshly harvested condition of the treated crown is effectively maintained for an extended period of time. The extended shelf life of the crown also serves to delay deterioration of the fruit and the time period for marketability of pineapples treated in accordance with this invention is, therefore, increased.

DETAILED DESCRIPTION OF THE INVENTION

This invention is based on the surprising discovery that certain plant grown regulators are effective for extending the shelf life of fresh pineapples. Accomplishment of this desirable goal is realized by treating the crowns of the pineapples with sufficient amounts of the plant growth regulators to retard withering and senescence of the crowns.

The plant growth regulators found to be effective for the purpose of this invention are the gibberellins, a group of naturally occuring and structurally related organic compounds having in common the gibbane skeleton:

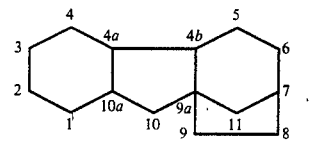

The most widely used gibberellin at the present time is gibberellic acid which is frequently referred to in the literature as $GA_3$ but whose chemical nomenclature is 2,4a,7-trihydroxy-1-methyl-8-methylene-gibb-3-ene-1,10-dicarboxylic acid-1,4a-lactone. At least 57 gibberellins have been identified and assigned code designations $GA_1$ through $GA_{57}$. The gibberellins are discussed in the McGraw-Hill Encyclopedia of Science and Technology, Volume 6, pages 255–259, published in 1982 by McGraw-Hill Book Company, New York, N.Y., and the teachings set forth in that article are incorporated herein by reference. Although gibberellic acid (i.e., $GA_3$) is not regarded as the most active gibberellin, it is the most widely used gibberellin because it is available in commercial quantities under various trade names.

Treatment of the pineapple crowns with the gibberellins is preferably carried out by employing an aqueous solution of one or more gibberellins. The concentration of the gibberellin(s) in the aqueous medium should be between 5 and 2,000 parts per million (ppm) and preferably between 50 and 500 ppm. The aqueous solution may be supplied to the pineapple crowns by any convenient method such as spraying, dipping or drenching so long as a major portion of the crown is contacted with the solution. A typical treatment by dipping involves submerging the crown for 10 seconds in a solution containing 200 ppm gibberellins followed by a 5-second draining period. This results in sufficient residues of gibberellins on the crown to produce the desired effect. The absolute residual amounts of the applied gibberellin required to retard withering and senescense of the crown will depend on various factors including the size of the crown, the particular gibberellin(s) employed and the composition of the treating medium applied. In general, however, each pineapple crown should be treated with at least 0.01 milligram and, preferably, at least 0.1 milligram of gibberellin(s) to retard significantly the withering and senescence of the crowns. Treatment of the shell or skin of the pineapple is unnecessary.

The gibberellin-containing medium is, of course, applied to pineapples which have reached the desired degree of maturity and ripeness for harvesting. Although it is possible to treat pineapples in the field just prior to harvest (i.e., no more than 2 weeks prior to harvest), such treatment is generally less satisfactory because weather conditions or other environmental factors may result in dilution or removal of the active gibberellin agent from the leaves of the crowns before the pineapples can be harvested. Therefore, it is preferred that the gibberellin-containing medium be applied to harvested pineapples since this provides a greater degree of control over the treatment procedure as well as over the subsequent processing or handling of the pineapple related to marketing thereof. It is preferred that the gibberellin-containing medium be applied to the crown within two weeks and preferably within 72 hours and most preferably within 24 hours after harvesting of the pineapple in order to achieve maximum effectiveness of the treatment. If treatment with the gibberellins is delayed for more than 72 hours after harvesting, the pineapples should be stored at reduced temperatures (e.g., 50° F. and 80-90% relative humidity) until the crowns can be treated.

This invention does not alter the conventional techniques employed in the harvesting, storage, shipment and marketing of fresh pineapples. Thus, the temperature and humidity conditions normally used for preserving the freshness of harvested pineapples are suitable for use in connection with this invention. For example, storage at 50° F. and relative humidity of 80-90% helps to preserve freshness of the treated pineapples. The application of a waxy protective film to the shell or skin of the pineapple may be effected; however, care should be taken so that the waxy coating is not applied to a significant portion of the crown if the waxy coating is to be applied before the crown is treated with the gibberellin-containing medium. If a wax coating is to be applied to the pineapple, it is preferred that treatment of the crown with the gibberellin(s) precede the application of wax to the shell of the pineapple.

In a preferred embodiment of this invention, a suitable emulsifying or dispersing agent is included in the gibberellin-containing aqueous medium. The emulsifier enhances the effectiveness of the gibberellin(s) and permits somewhat lower concentrations of gibberellin(s) to be used in the treating medium. The emulsifier concentration in the treating medium should be in range of 50 to 5000 ppm and preferably should be between 100 to 2000 ppm. Suitable emulsifying agents are commercially available and include substituted phenoxy polyethoxyethanols sold under the trade name "Triton X" and polyoxalkylene derivatives of sorbitan monooleate sold under the trade name "Tween."

The advantages of the present invention are further illustrated by the examples which follow. In these examples the condition of the crown on each pineapple was visually observed and was then assigned a score of 1 to 5 with a score of 1 representing the worst condition (i.e., most of the leaves being dry and brown) and a score of 5 representing the best condition (i.e., no visible brown spots or brown areas on the leaves). Intermediate conditions were scored at levels between 1 and 5 depending on the degree to which the leaves had turned dry and brown. The scores for each group of pineapples were then averaged to give a representative score for the treated pineapples as well as for the untreated control group. The pineapples selected for these tests were mature specimens ready for harvest having healthy crowns which qualified them for a rating between 4 and 5 in the scoring system. The storage conditions to which the treated and control pineapples were subjected were intended to simulate typical conditions encountered in the distribution and marketing of fresh pineapples.

EXAMPLE 1

Harvested mature pineapples having undamaged crowns were assembled into two groups of 10 each. The condition of the crown on each pineapple was evaluated and the assigned scores were averaged to give a test group of pineapples having an average score of 4.60 and a control group having an average score of 4.50. The crowns in the test group of pineapples were treated with an aqueous solution of gibberellins (product obtained from Sigma Chemical Company of St. Louis, Mo. and containing $GA_3$ of at least 90 percent purity) having a concentration of 100 ppm. The crowns in the control group of pineapples were treated only with water. Both treatments were applied approximately 28 hours after the pineapples were harvested. Both groups of pineapples were then stored for 10 days at 50° F. (85% relative humidity) and 17 days at 70° F. (85% relative humidity) before the condition of the crowns was again evaluated. The average score for the gibberellin-treated pineapples was 3.54 while the average score for the control group was 2.29.

EXAMPLE 2

The general procedure of Example 1 was repeated except that the aqueous medium for both test and control groups contained 0.1 percent by weight of Triton X-45, a nonionic surfactant available from Sigma Chemical Company and the storage period was 10 days at 50° F. and 13 days at 70° F. (85% relative humidity). At the end of the storage period the average score for the gibberellin-treated pineapples was 4.20 and that for the control group was 2.30 as compared with initial scores of 4.60 and 4.50, respectively. These results indicate that the surfactant increases the effectiveness of the gibberellins applied to the crown.

EXAMPLE 3

Five groups of harvested pineapples (10 in each group) were assembled for treatment with various levels of gibberellins. In this experiment the whole pineapple was sprayed approximately 24 hours after harvest with the aqueous medium and the gibberellin product (GA) used was that described in Example 1. The aqueous medium also contained 0.1 percent by weight Triton X-45. The treated pineapples were stored at 50° F. for 10 days and at 70° F. for 13 days (85% relative humidity). The initital average crown scores and the average crown scores after storage are shown below:

| Treating Medium | Initial Crown Score | Crown Score After Storage |
| --- | --- | --- |
| 0.1% Triton X-45 | 4.5 | 2.3 |
| 100 ppm GA, 0.1% Triton X-45 | 5.0 | 4.5 |
| 250 ppm GA, 0.1% Triton X-45 | 4.6 | 4.1 |
| 500 ppm GA, 0.1% Triton X-45 | 4.6 | 4.1 |
| 750 ppm GA, 0.1% Triton X-45 | 4.5 | 4.2 |

The above results indicate that higher levels of gibberellins in the aqueous treating medium do not provide significantly greater benefits than those obtained with a gibberellin concentration of 100 ppm.

EXAMPLE 4

Using the general procedure of Example 3, groups of 10 pineapples each were treated with a commercial wax preparation commonly used to provide a protective coating on fresh fruits. The wax preparation is sold by FMC Corporation of Philadelphia, Pa. under the designation FMC-7051 and it was applied in the form of a 5 percent by weight aqueous medium to three groups of pineapples by (1) dipping only the body of the pineapples, (2) dipping only the crown of the pineapples and (3) dipping the entire pineapple. A fourth group of pineapples was treated by dipping the body of each pineapple in the wax-containing medium and dipping the crown of each pineapple in an aqueous medium containing 100 ppm gibberellins and 0.1 percent Triton X-45. A fifth group of pineapples was treated by dipping the entire pineapple in an aqueous medium containing 5 percent by weight of the FMC-7051 wax preparation and 250 ppm gibberellins. The average crown scores were as follows:

| Treating Medium | Initial Crown Score | Crown Score After Storage |
| --- | --- | --- |
| 5% FMC-7051 applied to body | 4.5 | 2.7 |
| 5% FMC-7051 applied to crown | 4.5 | 2.6 |
| 5% FMC-7051 applied to body and crown | 4.5 | 2.5 |
| 5% FMC-7051 applied to body, 100 ppm GA and 0.1% Triton X-45 applied to crown | 4.5 | 4.1 |
| 5% FMC-7051 and 250 ppm GA applied to body and crown | 4.8 | 3.9 |

The above results demonstrate the effectiveness of the applied gibberellins as compared with the applied wax preparation alone.

EXAMPLE 5

This example illustrates the effectiveness of other gibberellin products which are commercially available under the trade name Pro-Gibb from Abbott Laboratories of Chicago, Ill. Pro-Gibb is available as a solid containing 10 percent by weight $GA_3$ and as a liquid containing 2 percent by weight $GA_3$. An aqueous solution was prepared with sufficient 10 percent $GA_3$ product to give a $GA_3$ concentration of 100 ppm. Another aqueous solution was prepared from the 2.0 percent $GA_3$ product to give a $GA_3$ concentration of 50 ppm. Groups of 10 pineapples each were treated approximately 24 hours after harvest by dipping the body of each pineapple in a 5 percent FMC-7051 wax medium and the crowns were then dipped in the gibberellin-containing solutions which also contained 0.1 percent Triton X-45. The treated pineapples were stored at 50° F. for 10 days and at 70° F. for 17 days. The results were as follows:

| Treating Medium | Initial Crown Score | Crown Score After Storage |
| --- | --- | --- |
| 0.1% Triton X-45 | 4.5 | 2.3 |
| 5% FMC-7051 applied to body, 100 ppm $GA_3$ applied to crown | 4.6 | 4.1 |
| 5% FMC-7051 applied to body, 50 ppm $GA_3$ applied to crown | 4.6 | 3.7 |

EXAMPLE 6

Groups of 32 pineapples each were subjected to treatment approximately 4 hours after harvest. One group was treated with a 5 percent FMC-7051 wax medium which also contained 0.3 percent by weight Benlate, a commercial fungicide available from E. I. duPont de Nemours & Company of Wilmington, Del. The wax/fungicide medium was applied by dipping the body of each pineapple in the medium. A second group of pineapples was similarly treated and was further treated with gibberellins by dipping the crown of each pineapple in an aqueous solution containing 200 ppm of $GA_3$ and 0.1 percent by weight Triton X-45. Both groups of treated pineapples were placed upright in boxes without covers taking care to avoid damage to the crowns. The filled boxes were stored at 50° F. and 80% relative humidity for 7 days and at ambient temperatures (80% relative humidity) for 10 days. The average crown score at the end of the storage period was 4.1 for the $GA_3$-treated pineapples and 3.1 for the control group as compared with an initial score of 5.0 for each group. The control group exhibited yellowing of almost all crown leaves (particularly the lower leaves) whereas the $GA_3$-treated crowns remained green.

EXAMPLE 7

A large number of harvested pineapples were processed approximately 24 hours after harvest and stored using methods designed to simulate the commercial processing and marketing of fresh pineapples. In this experiment a total of 300 pineapples was sorted, randomized and labeled before rinsing the fruit with clean water to remove debris and soil. The washed pineapples were then waxed by dipping the body of the pineapple in an aqueous medium containing 5 percent by weight of FMC-7051 wax preparation and 0.3 percent by weight of a fungicide (Benlate). Each pineapple was held in the wax-containing medium for 10 seconds. The crowns of 200 of the washed and waxed pineapples were then sprayed with an aqueous medium containing 200 ppm gibberellic acid (Pro-Gibb Plus 10% was used) and 0.1 percent Triton X-45. This aqueous medium was applied to the crowns by an array of 6 spray nozzles (Unijet Type T nozzles available from Spraying Systems Company of Wheaton, Ill.) while pineapples (lying on their sides) were moved by a belt conveyor at a speed of 45 feet per minute. The flow rate of the aqueous medium to each spray nozzle was maintained at 1.0 to 1.1 gallons per hour. A control group of waxed pineapples was maintained with untreated crowns for comparison purposes. All pineapples were then stored at 50° F. and 85% relative humidity for 10 days to simulate shipping conditions. This was followed by storage at 70° F. and 85% relative humidity for an additional 38 days to simulate marketing conditions for fresh fruit. The pineapple crowns were visually evaluated periodically during the storage period using the crown scoring system described above. The crown scores in this experiment are shown below:

| Post Harvest Time Period (days) | Storage Conditions | Crown Scores Treated | Crown Scores Control |
|---|---|---|---|
| 1 | 50° F., 85% R.H. | 4.60 | 4.60 |
| 7 | 50° F., 85% R.H. | 4.55 | 4.40 |
| 10 | " | 4.50 | 4.05 |
| 11 | 70° F., 85% R.H. | — | — |
| 14 | " | 4.44 | 2.88 |
| 20 | " | 4.13 | 2.48 |
| 27 | " | 3.73 | 1.89 |
| 34 | " | 3.67 | 1.56 |
| 42 | " | 3.53 | 1.19 |
| 48 | " | 3.36 | 1.05 |

The crown scores in this experiment clearly demonstrate the effectiveness of the gibberellin-treated pineapples even after an extended storage period.

What is claimed is:

1. A method for prolonging the fresh appearance of freshly harvested pineapples which comprises treating the crowns of the pineapples with sufficient amounts of a gibberellin to retard withering and senescence of the crowns.

2. The method of claim 1 wherein the crowns are treated with an aqueous medium containing from 5 to 2000 ppm of said gibberellin.

3. The method of claim 1 wherein the crowns are treated with an aqueous medium containing from 50 to 500 ppm of said gibberellin.

4. The method of claim 1, 2 or 3 wherein the gibberellin is applied to said crowns during the time period extending from two weeks prior to harvest of said pineapples to two weeks subsequent to harvest of said pineapples.

5. The method of claim 4 wherein the crowns are treated with said gibberellin in combination with an emulsifier.

6. The method of claim 5 wherein the crowns are treated with an aqueous medium containing said gibberellin and from 50 to 5000 ppm of said emulsifier.

7. A method for prolonging the fresh appearance of freshly harvested pineapples which comprises applying to the crowns of the pineapples an aqueous medium containing from 5 to 2000 ppm of gibberellins, said gibberellins comprising a plurality of compounds possessing the gibbane skeleton.

8. The method of claim 7 wherein said gibberellins includes gibberellic acid ($GA_3$).

9. The method of claim 8 wherein said aqueous medium is applied in the form of a spray to growing pineapples not more than 2 weeks prior to harvesting of the treated pineapples.

10. The method of claim 8 wherein said aqueous medium is applied to the crowns within two weeks after the pineapples are harvested.

11. The method of claim 7, 8, 9 or 10 wherein said aqueous medium also contains an emulsifier in concentrations of 50 to 5000 ppm.

12. The method of claim 11 wherein said aqueous medium contains from 50 to 500 ppm of gibberellins and the medium is applied to the crowns within the 72 hours after harvesting the pineapples.

* * * * *